Oct. 9, 1934.   L. J. ADAMS   1,976,471
AUTOMATIC AUTOMOBILE BRAKE LOCK
Filed April 5, 1932
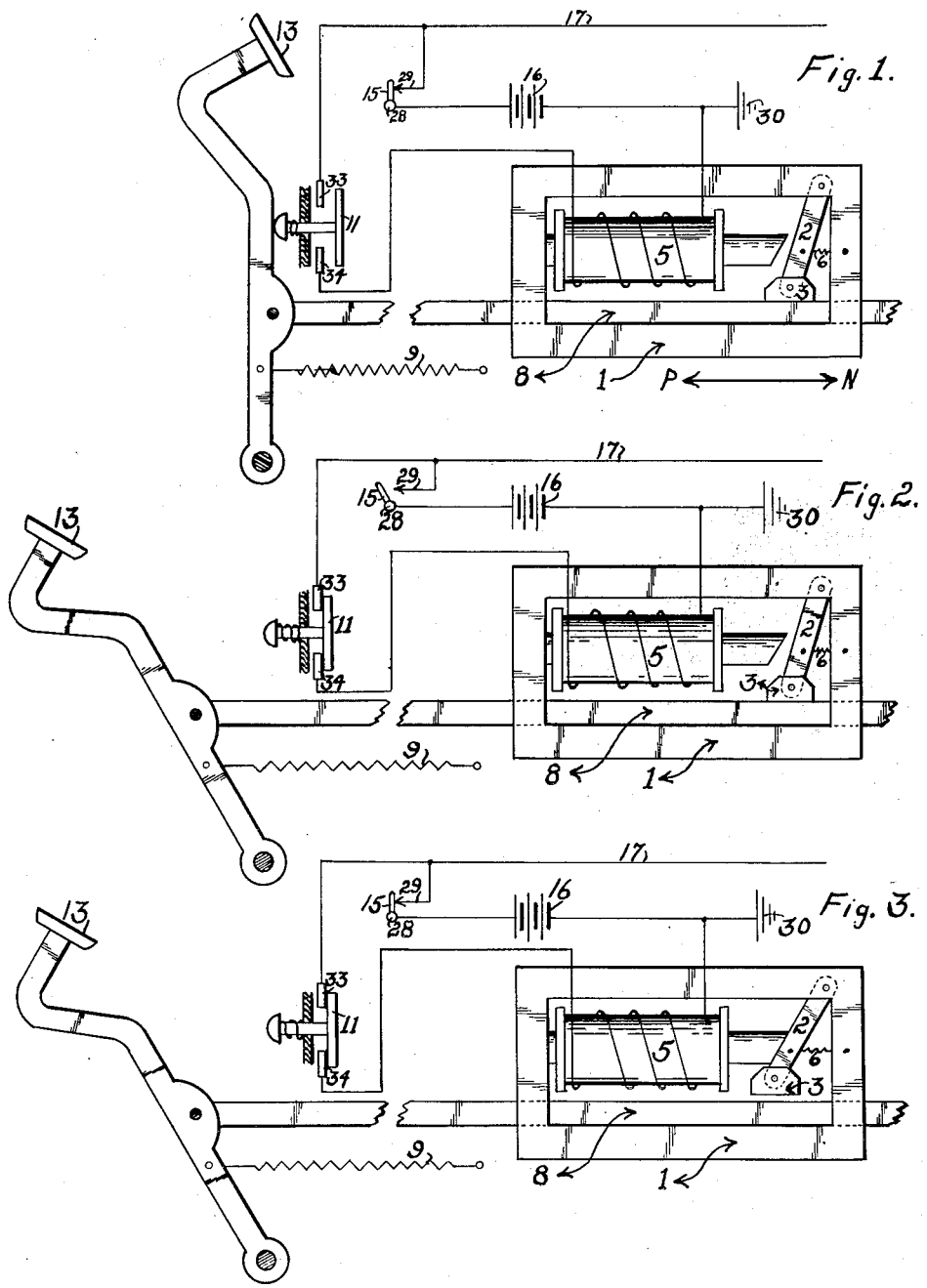
Inventor
Leland J. Adams Patented Oct. 9, 1934

1,976,471

UNITED STATES PATENT OFFICE

1,976,471

AUTOMATIC AUTOMOBILE BRAKE LOCK

Leland J. Adams, Glendale, Calif.

Application April 5, 1932, Serial No. 603,413

1 Claim. (Cl. 192—3)

This invention relates to an automatic automobile brake lock. This invention concerns a brake locking apparatus which locks the brakes in a set position, when set, after the ignition switch has been turned off. And will allow brakes to operate free (not locking the brakes in their set position) while the ignition switch is on.

The general object of this invention is to allow the foot brakes to be used as a parking brake, without the use of a hand lever, and also serve as a lock for the car.

The controlling apparatus includes electrically controlled means for allowing the brakes to release when the ignition switch has been turned on, and when enough pressure has been applied to the brake pedal to release the mechanical binding qualities of this apparatus.

One of the objects of this invention is to allow the driver of the car to turn the ignition switch on, and start the engine without the brakes releasing until he has applied enough pressure to the foot brake pedal to release the mechanical binding of the apparatus, which is an advantage when starting the car on a hill.

Further objects of this device will appear hereinafter.

The invention consists of the novel parts and combination of parts to be described hereinafter, all of which contribute to produce an efficient automatic automobile brake lock.

A further object of the invention is to provide automatic electrical control apparatus of this type which can be readily connected up to the usual grounded ignition circuit using the regular battery for the ignition circuit and effecting the control of releasing, or locking the brake or brakes in a set position through the agency of the usual key-controlled ignition switch.

A preferred embodiment of the invention is described in the following specifications, while the broad scope of the invention is pointed out in the appended claim.

In the drawing:

Figure 1 is a diagrammatic view illustrating my apparatus as applied to the ignition switch and illustrating the brake pedal for applying the brakes. This figure shows the ignition switch in a closed position and shows the parts in the relation which they have when the brakes are "off".

Figure 2 is a view similar to Figure 1 but showing the relation of the parts when the brakes are locked in their set position and the ignition switch is in its open position.

Figure 3 is a view similar to Figures 1 and 2 but showing the relation of the parts when the brakes are manually being held in a set position and the ignition switch is in its closed position.

Before proceeding to a detailed description of my invention, it should be stated that according to my invention, when the ignition switch (which is usually operated by a key) is drawn to its open position to open the ignition circuit the locking apparatus operates automatically, locking the brakes in their set position after the said brakes have been set. Moving the ignition switch in its closed position after the brakes have been set and locked, will not effect an automatic release of the brakes until enough pressure has been applied to the foot pedal to release the mechanical binding at which time the electro-magnetic releasing coil will allow the brakes to release. When the ignition switch has been moved to its closed position and the brakes released, the electrical control circuit will operate to allow the brakes to be operated manually, in a "set" or a "released" position, without the said brakes locking in their set position. I also include a switch for opening the release circuit when the brakes are in their "off" position.

Referring more particularly to the parts, and especially to Figure 2, 15 indicates an ignition switch provided with two contacts 28 and 29. When the switch member is in a neutral position as shown, these contacts are not connected with each other, but when the driver of the car wishes to start up the engine, the key is inserted and the switch member thrown to the right, thereby effecting engagement with the contacts 28 and 29, closing the ignition circuit 17.

In applying the invention, I provide a movable member 8, being connected to a moving member of the brake such as a brake pedal 13, the movement of which will apply the brakes, an electromagnetic coil 5, which, when energized, holds shoe 3 in a position to allow movable member 8, to be moved in both directions N and P, sliding between body 1, and shoe 3, a spring 6, connected to link 2, and body 1, causing binding of shoe 3, with movable member 8, and locking the movable member 8, from moving in N direction, when the electro-magnetic coil (5) circuit is open, a switch 11, connected with the control circuit and operated by a movable member of the brakes, in such a manner as to close contacts 33 and 34, when the brakes are in their set position, and open when the brakes are in their off position, and an ignition switch 15. Spring 9 tends to hold brakes in their "off" position.

In connecting this apparatus to the brakes, it must be connected so the movement of movable member 8, will be in P direction to set the brakes.

The general mode of operation of the apparatus as illustrated in Figure 1 will now be described. The ignition switch 15 has been moved to its closed position, and the brakes are in their "off" position. Current now flows from the battery 16, to ignition switch 15, through the ignition circuit 17. Also from battery 16, to ignition switch 15, to contact 33, of switch 11. The circuit being open through the magnetic coil 5, allowing shoe 3, to hold movable member 8, from movement in N direction. The driver now applies the brakes by pressing on the foot brake pedal 13. Now the parts take positions as illustrated in Figure 3. The current now flows from battery 16, to ignition switch 15, to contacts 33 and 34, of switch 11, through electro-magnetic coil 5, and to ground 30. The electro-magnetic coil 5 being energized, holds shoe 3 in a position to allow movable member 8 to move in either direction N or P. If the driver wishes to set and lock the brakes, in their set position, he turns the ignition switch 15, in the open position, and presses on the foot brake pedal 13 the desired amount. Now the electro-magnetic coil 5 circuit is opened at the ignition switch 15, allowing spring actuated shoe 3, to engage with movable member 8, locking the brakes in their set position, as illustrated in Figure 2. When the driver wishes to release the brakes he turns the ignition switch 15 to its closed position, presses on the foot brake pedal 13 to release the mechanical binding, of shoe 3 and movable member 8, allowing the electro-magnetic coil 5, (which is energized now by a flow of current from battery 16, to ignition switch 15, to contacts 33 and 34 of switch 11, through coil 5 to ground 30) to hold shoe 3, clear of movable member 8, allowing the brakes to release.

It should also be understood that the magnetic coil 5, when energized may or may not be of such a capacity, to effect an automatic release of the brakes when the ignition switch 15 has been turned to its closed position, without applying pressure to the foot brake pedal 13.

It will be noted that the usual grounded ignition circuit is not disturbed by my control wiring being imposed on it, using metallic control circuit.

While I have illustrated a battery for supplying the current in this apparatus it should be understood that any source of electro-motive force may be employed.

It is understood that the embodiment of the invention described herein is only one of many embodiments this invention may take, and I do not wish to be limited in the practice of the invention, nor in the claim, to the particular embodiment set forth.

I claim:

In an electrically controlled brake locking apparatus, the combination of a movable member for setting the brakes, a locking member normally operating to lock said movable member from movement in the direction releasing the brakes and allowing movement of said movable member in the direction setting the brakes, regardless of the brake setting, an electro-magnetic coil associated with said locking member, which, when energized and after pressure has been applied to said movable member in the direction setting the brakes, holds said locking member in a position to allow movement of said movable member in the directions releasing or setting the brakes, an ignition switch for closing the ignition circuit, a branch circuit including said electro-magnetic coil, connected to and controlled by the ignition switch for controlling the energizing of said electro-magnetic coil when the ignition switch is moved to close the ignition circuit, and a switch for opening the electro-magnetic coil circuit at will after the ignition switch has been moved to close the ignition circuit.

LELAND J. ADAMS.